(12) United States Patent
Bin Sabtu et al.

(10) Patent No.: US 11,197,470 B2
(45) Date of Patent: Dec. 14, 2021

(54) FISHING REEL

(71) Applicant: Shimano Components (Malaysia) SDN. BHD., Johor (MY)

(72) Inventors: Baihaki Bin Sabtu, Johor (MY); Abu Supian Bin Ahmad, Johor (MY); Muhammad Aliff Nazreen Bin Norazmi, Johor (MY); Muhd Syukri Nazry Bin Mustapha, Johor (MY); Mohd Syamsul Johary Bin Ismail, Johor (MY); Mohammad Asyraaf Bin Ariffen, Johor (MY); Muhammad Zaidi Bin Bachok, Johor (MY)

(73) Assignee: SHIMANO COMPONENTS (MALAYSIA) SDN. BHD., Johor (MY)

( * ) Notice: Subject to any disclaimer, the term of this patent is extended or adjusted under 35 U.S.C. 154(b) by 0 days.

(21) Appl. No.: 17/072,339

(22) Filed: Oct. 16, 2020

(65) Prior Publication Data

US 2021/0185993 A1   Jun. 24, 2021

(30) Foreign Application Priority Data

Dec. 24, 2019   (JP) ................................. 2019-232833

(51) Int. Cl.
*A01K 89/01* (2006.01)
*A01K 89/015* (2006.01)
*A01K 89/00* (2006.01)

(52) U.S. Cl.
CPC .. *A01K 89/01127* (2015.05); *A01K 89/01925* (2015.05); *A01K 89/01928* (2015.05); *A01K 89/006* (2013.01)

(58) Field of Classification Search
CPC .... A01K 89/011221; A01K 89/011223; A01K 89/01928; A01K 89/0193; A01K 89/006; A01K 89/01917
See application file for complete search history.

(56) References Cited

U.S. PATENT DOCUMENTS

| | | | |
|---|---|---|---|
| 6,575,392 B1 * | 6/2003 | Hong | A01K 89/01928 242/319 |
| 2015/0115088 A1 * | 4/2015 | Toma | F16C 33/765 242/283 |
| 2017/0238516 A1 * | 8/2017 | Ahmad | A01K 89/01928 |
| 2018/0125048 A1 * | 5/2018 | Takechi | A01K 89/01928 |
| 2020/0296947 A1 * | 9/2020 | Chew | A01K 89/0183 |

FOREIGN PATENT DOCUMENTS

JP    2017-147959 A    8/2017

* cited by examiner

*Primary Examiner* — Emmanuel M Marcelo
(74) *Attorney, Agent, or Firm* — United IP Counselors, LLC

(57) ABSTRACT

A fishing reel includes a support member, a supported member, and a seal member. The support member includes a support hole. The supported member includes a supported portion that is disposed inside the support hole, and an inclined portion that is disposed outside the support hole and is formed so that an outer diameter decreases toward the support hole. The seal member is elastically deformable. The seal member is disposed in contact with an end face around the support hole and an outer peripheral surface of the inclined portion.

9 Claims, 7 Drawing Sheets

FISHING REEL

CROSS-REFERENCE TO RELATED APPLICATIONS

This application claims priority to Japanese Patent Application No. 2019-232833, filed Dec. 24, 2019. The contents of that application are incorporated by reference herein in their entirety.

TECHNICAL FIELD

The present invention relates to a fishing reel.

BACKGROUND ART

Fishing reels have a seal member to prevent water from entering the inside of a reel body. For example, in Japanese Unexamined Patent Application Publication No. 2017-147959, a seal member seals between a guide member of a level wind mechanism and a support hole of a reel body that supports the guide member.

BRIEF SUMMARY

The conventional seal member is arranged between the outer peripheral surface of the guide member and the inner peripheral surface of the support hole, and high dimensional accuracy is required in both the axial direction and the radial direction.

An object of the present invention is to prevent seawater or the like from entering between a support hole that supports a supported member and the supported member with a simple configuration.

A fishing reel according to an aspect of the present invention includes, a support member, a supported member, and a seal member. The support member has a support hole. The supported member includes a supported portion and an inclined portion. The supported portion is disposed inside the support hole. The inclined portion is disposed outside the support hole and is formed so that an outer diameter decreases toward the support hole. The seal member is elastically deformable and is disposed in contact with an end face of the support hole and an outer peripheral surface of the inclined portion.

In this fishing reel, the seal member is disposed in contact with the end face of the support hole of the support member and the outer peripheral surface of the inclined portion of the supported member. That is, the seal member is urged by the inclined portion toward the end face of the support hole, and the seal member is arranged so as to press against both the end face of the support hole and the outer peripheral surface of the inclined portion. As a result, it is possible to effectively suppress water such as seawater and foreign matter from entering between the support hole and the supported portion with a simple configuration. Further, the seal member can be aligned with no special groove for aligning the seal member. Furthermore, when the supported member vibrates, the seal member attenuates the vibration transmitted from the supported member to the support member. In addition, the alignment of the seal member is facilitated.

The inclined portion may have a circular cross-section. The seal member may be an O ring. In this case, the seal member is urged toward the end face of the support hole regardless of the accuracy of the inclined portion, and thereby the waterproof performance of the seal member is unlikely to be affected by the accuracy of the inclined portion.

The fishing reel may include a reel body and a handle shaft. The reel body may include a first side plate, a second side plate disposed at a distance from the first side plate, and a first side cover configured to cover the first side plate from outside. The handle shaft may be supported rotatably between the first side plate and the first side cover. The supported member extends between the first side plate and the second side plate. The support member is the first side plate. The support hole may penetrate the first side plate in an axial direction of the handle shaft. In this case, since the support hole is positioned in the first side plate where the handle shaft is disposed, the seal member is able to suppress the entry of seawater or the like through the support hole to the handle shaft and other mechanisms disposed around the handle shaft.

The supported member may guide a slide member that is slidable with respect to the support member. In this case, the support member attenuates the vibration transmitted from the sliding member to the support member.

The fishing reel may include a bearing configured to support an end of the handle shaft. The first side plate may include a bearing housing portion configured to house the bearing. The support hole may be located at a bottom of the bearing housing portion. In this case, the seal member suppresses the entry of seawater or the like through the support hole to the bearing.

The support member may be a bearing configured to rotatably support the supported member. In this case, the seal member suppresses the entry of seawater or the like between the bearing and the supported member.

In a fishing reel according to an aspect of the present invention, it is possible to prevent seawater or the like from entering between a support hole that supports a supported member and the supported member with a simple configuration.

DETAILED DESCRIPTION

Figure 1:
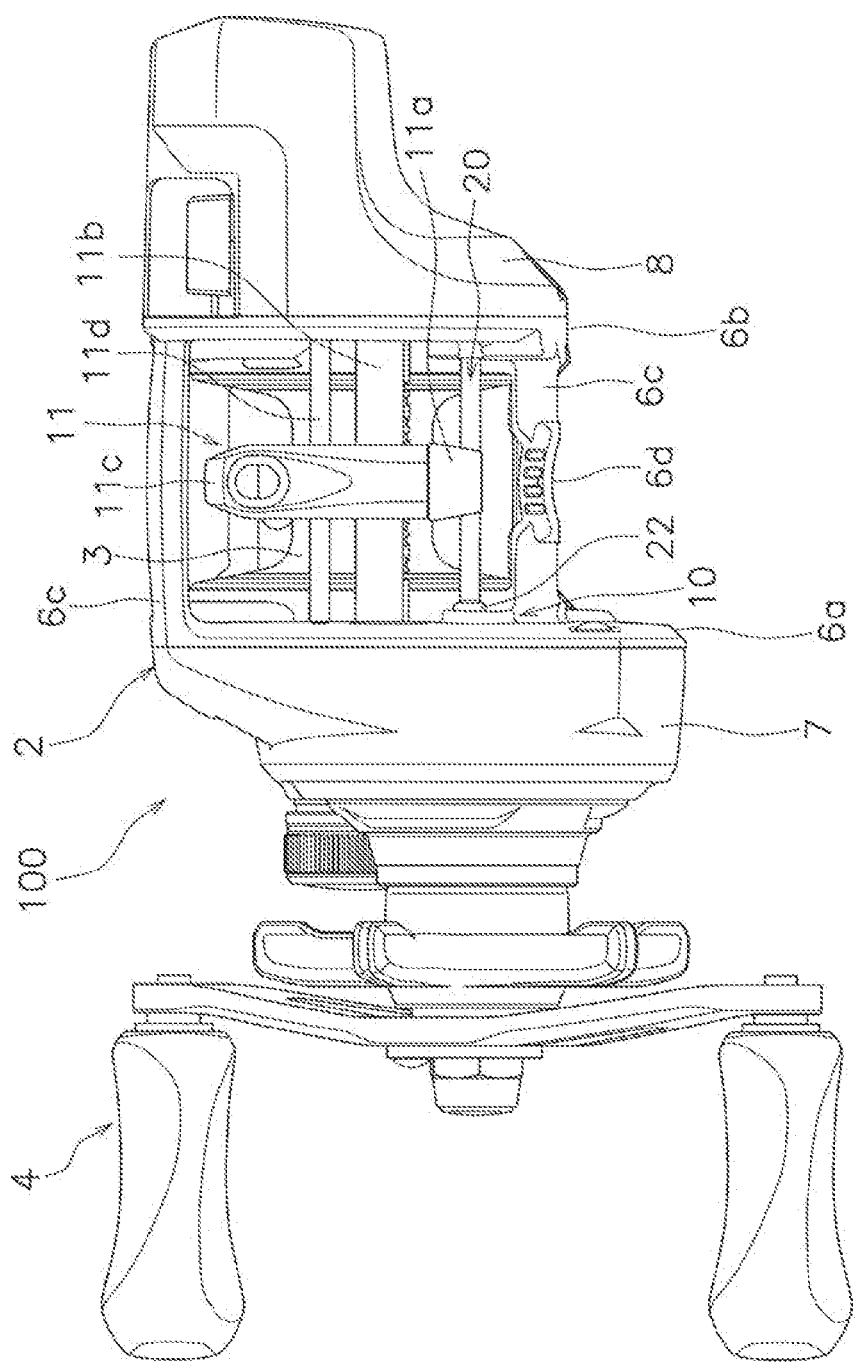
FIG. 1 is a front view of a double bearing reel according to one embodiment of the present invention.

FIG. 1 is a front view of a double bearing reel 100 according to one embodiment of the present invention. The double bearing reel 100 is one example of a fishing reel. The double bearing reel 100 includes a reel body 2, a spool 3, a handle 4, a stabilizer bar 20, and a seal member 22. The stabilizer bar 20 is one example of a supported member.

The double bearing reel 100 further includes: a rotation transmission mechanism configured to transmit the rotation of the handle 4 to the spool 3; a drag mechanism configured to brake the rotation of the spool 3 in a fishing-line feeding direction; a casting control mechanism configured to adjust the braking force that acts on the spool 3; a mechanical counter configured to display a number that changes based on the rotation of the spool 3; a clutch mechanism; and a level wind mechanism 11 configured to evenly wind a fishing line around the spool 3.

In this description, the direction in which the fishing line is released during fishing is referred to as the "front" and the opposite direction is referred to as the "rear". The term "right and left" means the right and left directions as the double bearing reel 100 (see FIG. 1) is viewed from the rear. Moreover, the term "up and down" means the up and down directions in a state where the double bearing reel 100 is attached to a fishing rod: the direction toward the end of the rod having the double bearing reel 100 is referred to as the "up" and the opposite is referred to as the "down".

Figure 2:
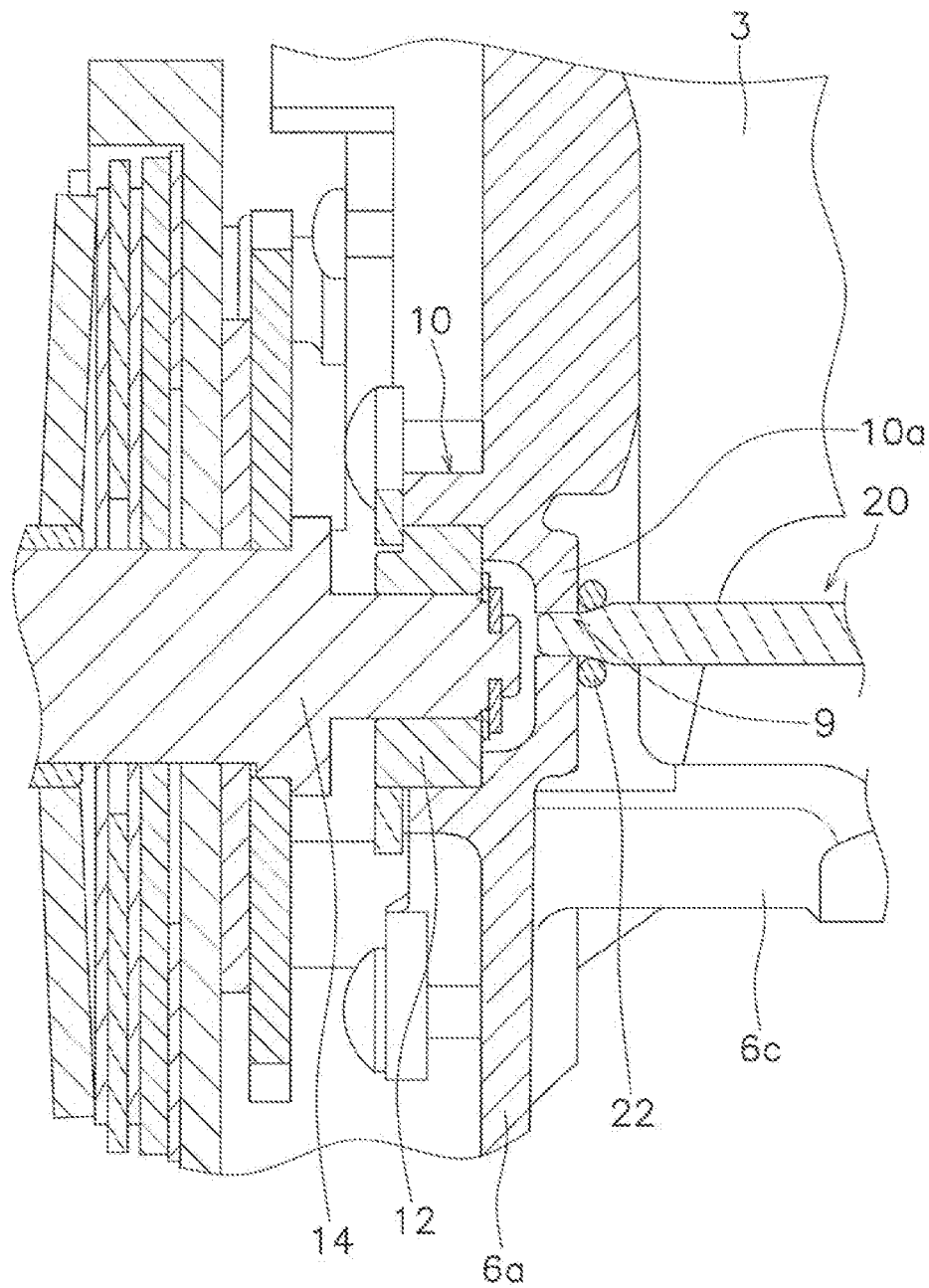
FIG. 2 is a cross-sectional view of a bearing housing portion and its vicinity cut along a plane perpendicular to a front-rear direction.

The reel body 2 includes a first side plate 6a, a second side plate 6b, a plurality of connection portions 6c, a rod mounting portion 6d, a first side cover 7, a second side cover 8, and a support hole 9 (see FIG. 2). The first side plate 6a, the second side plate 6b, the plurality of connection portions 6c, and the rod mounting portion 6d are integral in the present embodiment.

Figure 3:
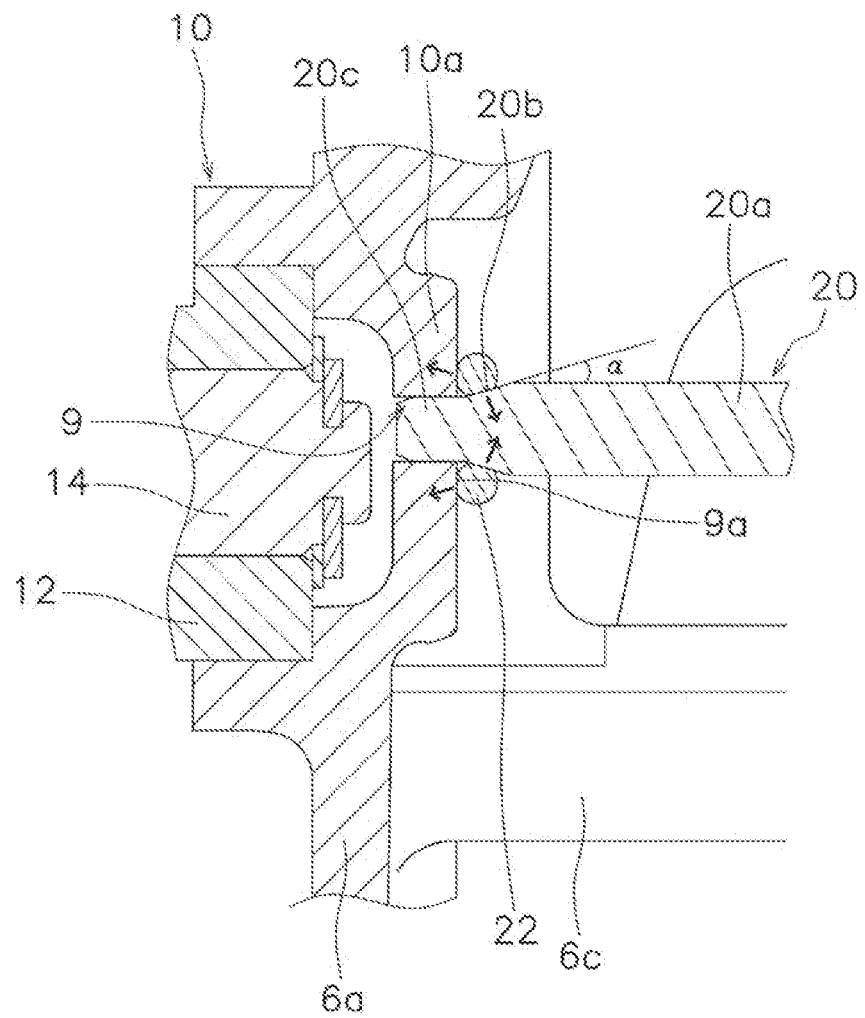
FIG. 3 is a partial enlarged view of FIG. 2.

The first side plate 6a is one example of a support member. The first side plate 6a is located on the right side of the reel body 2. The first side plate 6a has a bearing housing portion 10. FIG. 2 is a cross-sectional view of the bearing housing portion 10 and its vicinity cut along a plane perpendicular to the front-rear direction. FIG. 3 is a partially enlarged view of FIG. 2. As shown in FIGS. 2 and 3, the bearing housing portion 10 has a bottomed tubular shape. The bearing housing portion 10 is open from the first side plate 6a toward the handle 4. A bearing 12 is housed in the bearing housing portion 10. The bearing 12 is, for example, a rolling bearing, and rotatably supports one end of a handle shaft 14 that is rotatably connected to the handle 4.

The second side plate 6b is disposed on the left side of the reel body 2 at a distance from the first side plate 6a in the left-right direction. The plurality of connection portions 6c are arranged in the left-right direction and connect the first side plate 6a and the second side plate 6b. The rod mounting portion 6d is a portion where a fishing rod is mounted, and the rod mounting portion 6d extends in the front-rear direction.

The first side cover 7 covers the right-side face of the first side plate 6a. The second side cover 8 covers the left side face of the second side plate 6b.

The support hole 9 is located so as to penetrate the first side plate 6a in the axial direction of the handle shaft 14. In the present embodiment, the axial direction of the handle shaft 14 coincides with the left-right direction. The support hole 9 has, for example, a circular cross-section, and is located so as to penetrate a bottom portion 10a of the bearing housing portion 10 in the left-right direction. The support hole 9 supports one end of the stabilizer bar 20.

As shown in FIG. 3, the support hole 9 has an end face 9a. The end face 9a is a surface around and radially outside of the support hole 9, the surface being adjacent to the opening of the support hole 9 on the second side plate 6b side. The end face 9a in the present embodiment is a part of a surface of the bottom portion 10a of the bearing housing portion 10, the surface facing the second side plate 6b.

The spool 3 is disposed between the first side plate 6a and the second side plate 6b, and is rotatably supported by the reel body 2.

The handle 4 is rotatably mounted on the reel body 2 on the first side plate 6a side. The handle 4 is rotatably supported between the first side plate 6a and the first side cover 7. The rotation of the handle 4 is transmitted to the spool 3 via the handle shaft 14 and the rotation transmission mechanism.

The stabilizer bar 20 is a shaft member extending between the first side plate 6a and the second side plate 6b, as shown in FIG. 1. The stabilizer bar 20 extends linearly in the axial direction of the handle shaft 14. The stabilizer bar 20 has a right end supported by the first side plate 6a and a left end supported by the second side plate 6b. The stabilizer bar 20 is arranged above the rod mounting portion 6d when viewed from the front. The stabilizer bar 20 is located in front of the spool 3. The stabilizer bar 20 is located behind a lid member 11a of the level wind mechanism 11 to prevent the fishing line from getting entangled with the lid member 11a.

As shown in FIG. 3, the stabilizer bar 20 includes a body portion 20a, an inclined portion 20b, and a supported portion 20c. The body portion 20a extends between the first side plate 6a and the second side plate 6b.

The inclined portion 20b extends from one end of the body portion 20a (the right-side end in the present embodiment) in the axial direction. The inclined portion 20b is disposed between the body portion 20a and the supported portion 20c. The inclined portion 20b is located outside the support hole 9. The inclined portion 20b is also located on the second side plate 6b side relative to the bottom portion 10a of the bearing housing portion 10. The inclined portion 20b has an outer diameter that is larger than the inner diameter of the support hole 9. The outer diameter of the inclined portion 20b is smaller than the outer diameter of the body portion 20a. The inclined portion 20b is formed so that the outer diameter of the inclined portion 20b becomes smaller as it gets away from the main body portion 20a in the axial direction. That is, the inclined portion 20b is formed so that the outer diameter of the inclined portion 20b decreases toward the support hole 9.

The inclined portion 20b is inclined with respect to the axial direction preferably by an angle $\alpha$ of 15 degrees to 30 degrees. The inclined portion 20b is inclined with respect to the axial direction more preferably by an angle $\alpha$ of about 20 degrees. Further, the inclined portion 20b preferably has a circular cross-section.

The supported portion 20c extends axially from the inclined portion 20b. The supported portion 20c is located inside the support hole 9. The supported portion 20c has an outer diameter that is smaller than the inner diameter of the support hole 9 and the outer diameter of the inclined portion 20b. The supported portion 20c is supported by the support hole 9. The outer peripheral surface of the supported portion 20c is in contact with the inner peripheral surface of the support hole 9.

The seal member 22 is an elastically deformable member such as rubber. The seal member 22 is preferably an O-ring. The seal member 22 is disposed in contact with the end face 9a of the support hole 9 and the outer peripheral surface of the inclined portion 20b. The seal member 22 has an outer diameter that is larger than the inner diameter of the support hole 9. The inner diameter of the seal member 22 is preferably about the same as that of the support hole 9 or smaller than that of the support hole 9.

The seal member 22 is arranged so as to press against the end face 9a of the support hole 9 and the outer peripheral surface of the inclined portion 20b. That is, the seal member 22 is arranged so as to be urged toward the end face 9a of the support hole 9 by the inclined portion 20b. Specifically, as shown in FIG. 3, in a state where the seal member 22 is in contact with the end face 9a of the support hole 9 and the outer peripheral surface of the inclined portion 20b, a portion of the seal member 22 in contact with the end face 9a of the support hole 9 and a portion of the seal member 22 in contact with the outer peripheral surface of the inclined portion 20b are in an elastically deformed state.

In the double bearing reel 100 having the above configuration, the seal member 22 is disposed to be in contact with the end face 9a of the support hole 9 and the outer peripheral surface of the inclined portion 20b of the stabilizer bar 20, so as to press against the end face 9a of the support hole 9 and the outer peripheral surface of the inclined portion 20b. As a result, it is possible to effectively suppress the entry of water such as seawater or foreign matter between the support hole 9 and the supported portion 20c with a simple configuration. Therefore, it is possible to prevent water such as seawater from entering the bearing 12 via the support hole 9 and the supported portion 20c. Further, the seal member 22 can be aligned without any special groove for aligning the seal member 22. Further, when the stabilizer bar 20 vibrates, the vibration transmitted from the stabilizer bar 20 to the reel body 2 can be attenuated by the seal member 22.

Further, in the present embodiment, since the seal member 22 which is an O-ring is arranged around the inclined portion 20b having a circular cross-section, the seal member 22 is urged toward the end face 9a regardless of the accuracy of the inclined portion 20b. Thus, the waterproof performance of the seal member 22 is unlikely to be affected by the accuracy of the inclined portion 20b.

Other Embodiments

Although one embodiment of the present invention has been described above, the present invention is not limited to the above embodiment, and various modifications can be made without departing from the gist of the invention. In particular, a plurality of embodiments described herein can be arbitrarily combined as needed.

Figure 4:
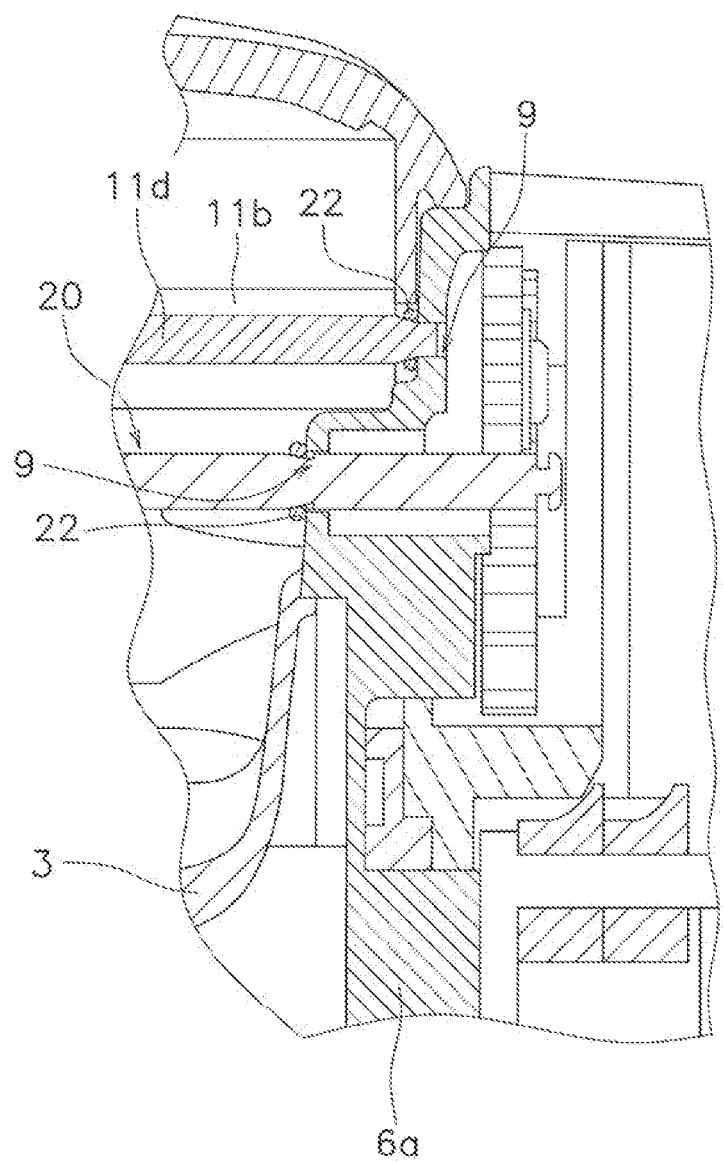
FIG. 4 is a cross-sectional view of a support hole and its vicinity in a double bearing reel according to another embodiment.
Figure 5:
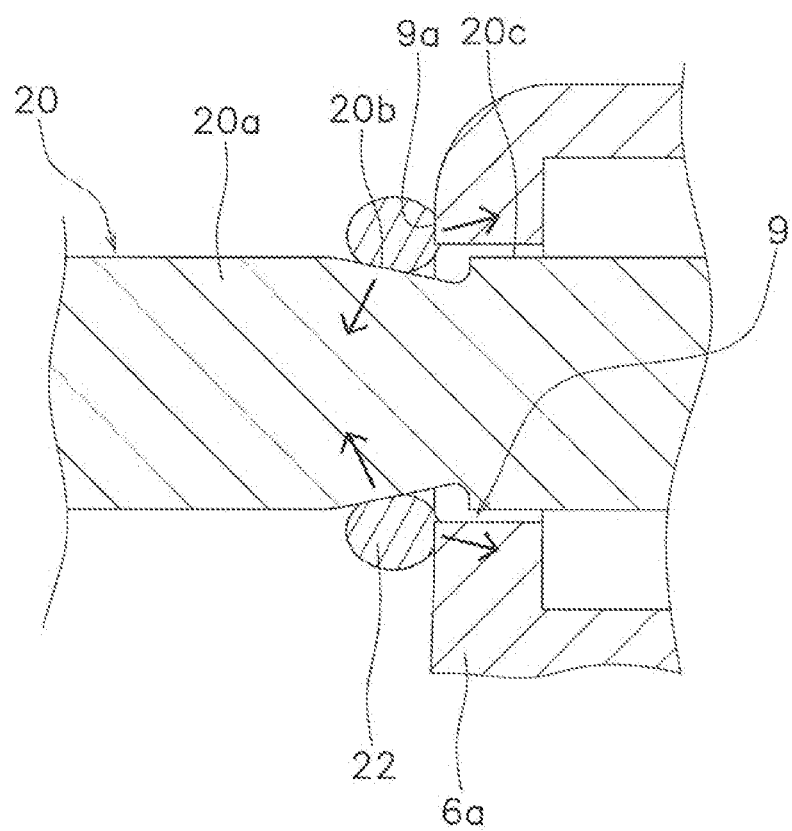
FIG. 5 is a partial enlarged view of FIG. 4.

The arrangement of the stabilizer bar 20 is not limited to that in the above embodiment. For example, as shown in FIG. 4, the present invention may be adapted to a double bearing reel in which the stabilizer bar 20 is disposed above a guide member 11b of the level wind mechanism 11. Further, in the above-described embodiment, the supported portion 20c is arranged in contact with the support hole 9, but it does not necessarily have to be in contact with the support hole 9. As shown in the enlarged view of FIG. 5, for example, a configuration is possible in which the outer diameter of the inclined portion 20b is smaller than the inner diameter of the support hole 9, and a part of the seal member 22 is in contact with the inner peripheral surface of the support hole 9. In this configuration, the supported portion 20c is supported by the support hole 9 via the seal member 22, and thus, the rattling of the stabilizer bar 20 can be reduced by the seal member 22.

In the above embodiment, the first side plate 6a of the reel body 2 is described as an example of the support member, and the stabilizer bar 20 is described as an example of the supported member. However, the support member and the supported member are not limited to those in the above-described embodiment. The supported member may be a member configured to guide a sliding member that is slidable with respect to the support member.

Figure 6:
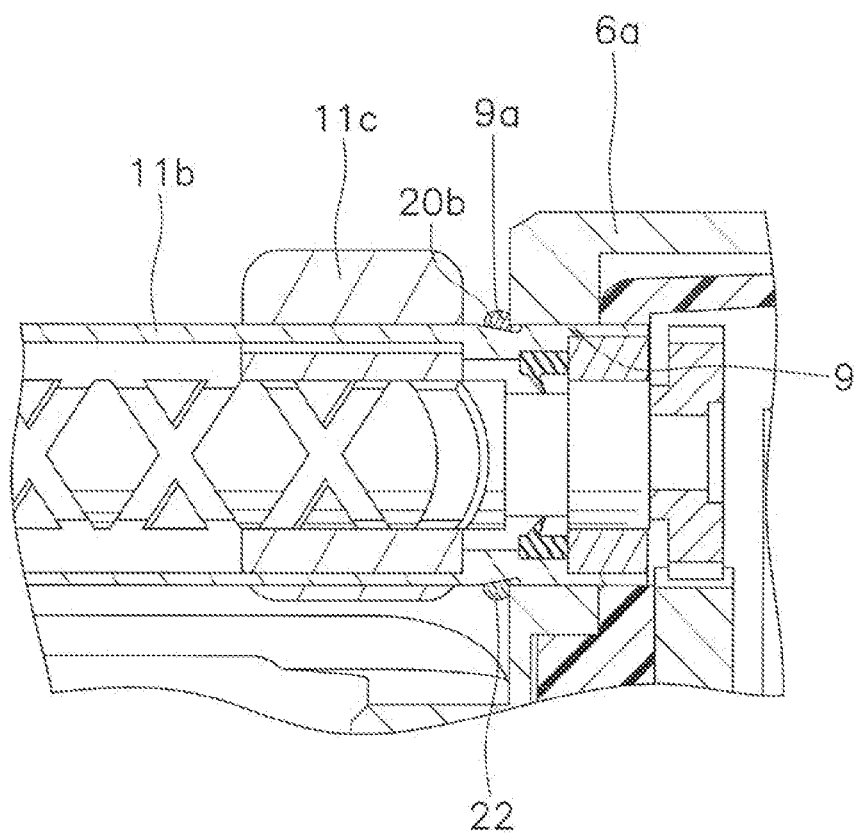
FIG. 6 is a cross-sectional view of a support hole and its vicinity in a double bearing reel according to yet another embodiment.

For example, as shown in FIG. 6, a configuration is possible in which the guide member 11b configured to slidably support a moving body 11c of the level wind mechanism 11 is used as a supported member, so that the seal member 22 seals between the support hole 9 supporting the guide member 11b and the guide member 11b. Alternatively, as shown in FIG. 4, a guide shaft 11d configured to slidably support the moving body 11c of the level wind mechanism 11 may be used as a supported member, so that the seal member 22 seals between the support hole 9 supporting the guide shaft 11d and the guide shaft 11d. In this case, the seal member 22 is able to attenuate the vibration caused by the sliding of the moving body 11c.

Figure 7:
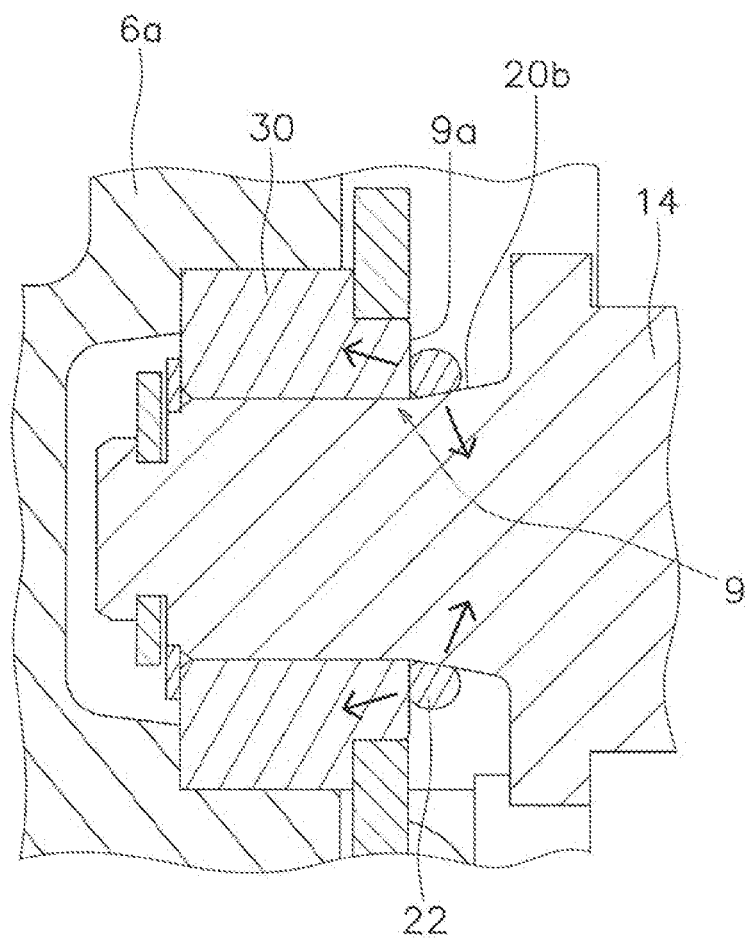
FIG. 7 is a cross-sectional view of a support hole and its vicinity in a double bearing reel according to still yet another embodiment.

The support member may be a bearing that rotatably supports the supported member. The supported member may be a shaft member that is rotatably supported by the bearing. For example, as shown in FIG. 7, in a double bearing reel in which one end of the handle shaft 14 is rotatably supported by a slide bearing 30, the seal member 22 may seal between the handle shaft 14 and the slide bearing 30. In this case, it is possible to prevent seawater or the like from entering the inside of the slide bearing 30.

In the above embodiments, the present invention is applied to the support member and the supported member for the double bearing reel. However, the present invention may be applied to the support member and the supported member for another fishing reel such as an electric reel and a spinning reel.

In the above embodiments, the seal member 22 seals between the support hole 9 on the first side plate 6a side and the stabilizer bar 20. However, a similar configuration may be provided on the second side plate 6b side of the support hole 9.

In the above embodiments, the O-ring is used as the seal member 22, but the seal member 22 is not limited to the above embodiments. The seal member 22 only needs to be arranged in contact with the end face 9a of the support hole 9 and the outer peripheral surface of the inclined portion 20b in a state where the seal member 22 is urged by the inclined portion 20b toward the end face 9a of the support hole 9.

REFERENCE SIGNS LIST

6a First side plate (one example of support member)
6b Second side plate
7 First side cover
9 Support hole
10 Bearing housing portion
10a Bottom portion
14 Handle shaft
20 Stabilizer bar (one example of supported member)
20b Inclined portion
20c Supported portion
22 Seal member
30 Bearing
100 Double bearing reel (one example of fishing reel)

What is claimed is:
1. A fishing reel comprising:
a support member including a support hole;
a supported member including a supported portion that is disposed inside the support hole, and an inclined portion that is disposed outside the support hole and is formed so that an outer diameter of the inclined portion decreases toward the support hole; and a seal member that is elastically deformable and is disposed in contact with an end face around the support hole and an outer peripheral surface of the inclined portion.

2. The fishing reel according to claim 1, wherein
the inclined portion has a circular cross-section, and
the seal member is an O ring.

3. The fishing reel according to claim 1, further comprising:
a reel body that includes a first side plate, a second side plate disposed at a distance from the first side plate, a first cover configured to cover the first side plate from outside; and
a handle shaft that is rotatably supported between the first side plate and the first side cover,
wherein
the supported member extends between the first side plate and the second side plate,
the support member is the first side plate, and
the support hole penetrates the first side plate in an axial direction of the handle shaft.

4. The fishing reel according to claim 3, further comprising
a bearing configured to support an end of the handle shaft, wherein
the first side plate includes a bearing housing portion configured to house the bearing, and
the support hole is located at a bottom of the bearing housing portion.

5. The fishing reel according to claim 1, wherein
the supported member guides a slide member that is slidable with respect to the support member.

6. The fishing reel according to claim 1, wherein
the support member is a bearing configured to rotatably support the supported member.

7. The fishing reel according to claim 1, wherein
the outer diameter of the inclined portion decreases to be smaller than an inner diameter of the support hole, and
the seal member is in contact with an inner peripheral surface of the support hole so as to support the supported portion in the support hole.

8. The fishing reel according to claim 1, wherein
the inclined portion is inclined by an angle of 15 degrees to 30 degrees with respect to an axial direction.

9. The fishing reel according to claim 1, wherein
the supported member includes a body portion and the inclined portion is disposed between the body portion and the supported portion.

* * * * *